UNITED STATES PATENT OFFICE.

LYDIA STEWART, OF SAN FRANCISCO, CALIFORNIA.

IMPROVEMENT IN MEDICATED TOWELS.

Specification forming part of Letters Patent No. 136,466, dated March 4, 1873.

*To all whom it may concern:*

Be it known that I, LYDIA STEWART, of San Francisco city and county, State of California, have invented a Medicated Towel; and I do hereby declare the following description and accompanying drawing are sufficient to enable any person skilled in the art or science to which it most nearly appertains to make and use my said invention without further invention or experiment.

My invention relates to a medicated towel, which is intended more particularly for drying the person after bathing.

For this purpose I take any ordinary towel, such as is used for drying the face, hands, or person; but I prefer to use one of the coarse kinds of towels such as is used after a bath for drying the person.

This towel I prepare in the following manner. I make a mixture of the following ingredients: Beef's gall, saltpeter, Cayenne pepper, common salt, arnica blossoms. I mix these ingredients together in a boiler, adding a little water, and then place the towels in the mixture, and allow them to boil about ten minutes, until the towel is thoroughly impregnated with the mixture. I then take the towels out, wring them, and press them until they are dry. If desired, the towels can be again placed in the boiler, and again boiled the same length of time, and again pressed and dried, after which they are rolled in bran or oatmeal. The exact proportion of the different ingredients to be used is not material, as the stronger the mixture the more active will be its effects.

The towel is to be used for drying the person after bathing or washing, and should be used with friction in the manner of drying the person with an ordinary towel.

By using this towel as above mentioned cutaneous diseases, paralysis, and all local affections can be arrested, and often entirely cured, while it imparts to the blood a healthful action, and frees the skin from all bad humors.

A towel once prepared in the above manner will retain its virtue about two months, when it will have to be again subjected to the same process.

Having thus described my invention, what I claim, and desire to secure by Letters Patent, is—

1. A medicated towel, for the purpose above described.

2. The combination of ingredients above mentioned, substantially as and for the purpose above described.

In witness whereof I hereunto set my hand and seal.

LYDIA STEWART. [L. S.]

Witnesses:
J. L. BOONE,
C. M. RICHARDSON.